United States Patent
Bier et al.

(10) Patent No.: US 12,203,670 B2
(45) Date of Patent: Jan. 21, 2025

(54) SYSTEM AND METHOD FOR DETERMINING HVAC SET POINTS

(71) Applicant: XEROX CORPORATION, Norwalk, CT (US)

(72) Inventors: Eric A. Bier, Palo Alto, CA (US); Kathryn F. Murphy, San Francisco, CA (US); Saman Mostafavi, San Francisco, CA (US); Warren Jackson, San Francisco, CA (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/566,126

(22) Filed: Dec. 30, 2021

(65) Prior Publication Data

US 2023/0228435 A1 Jul. 20, 2023

(51) Int. Cl.
| | | |
|---|---|---|
| F24F 11/46 | (2018.01) | |
| F24F 11/63 | (2018.01) | |
| G05B 19/042 | (2006.01) | |
| F24F 120/10 | (2018.01) | |
| F24F 140/00 | (2018.01) | |

(52) U.S. Cl.
CPC ............. F24F 11/46 (2018.01); F24F 11/63 (2018.01); G05B 19/042 (2013.01); *F24F 2120/10* (2018.01); *F24F 2140/00* (2018.01); *G05B 2219/2614* (2013.01)

(58) Field of Classification Search
CPC ........ F24F 11/46; F24F 11/63; F24F 2120/10; F24F 2140/00; F24F 11/30; F24F 11/006; G05B 19/042; G05B 2219/2614; G05B 15/02
See application file for complete search history.

(56) References Cited

U.S. PATENT DOCUMENTS

| | | | | |
|---|---|---|---|---|
| 2009/0314846 | A1* | 12/2009 | Helt | G05D 23/1905 236/46 R |
| 2012/0296479 | A1* | 11/2012 | Millar | F24F 11/62 700/277 |
| 2017/0211837 | A1* | 7/2017 | Gupta | G05D 23/1934 |
| 2020/0025402 | A1* | 1/2020 | Bell | G05D 23/1923 |
| 2020/0352514 | A1* | 11/2020 | Androulakis | F24F 11/65 |

(Continued)

OTHER PUBLICATIONS

Hoyt, Tyler, Edward Arens, and Hui Zhang. "Extending air temperature setpoints: Simulated energy savings and design considerations for new and retrofit buildings." Building and Environment 88 (2015): 89-96. https://escholarship.org/content/qt13s1q2xc/qt13s1q2xc.pdf.

(Continued)

*Primary Examiner* — Michael W Choi
(74) *Attorney, Agent, or Firm* — Krista A. Wittman

(57) ABSTRACT

A system and method for determining HVAC set points are provided. A present season is determined. An allowable temperature comfort range for each occupant in a room in a space is also determined. For each room, an energy saving set point temperature is calculated for the space based on the allowable temperature comfort range for that room. A set point temperature for the space is determined based on the energy saving set point temperatures for each of the rooms in the space. The set point temperature is provided to a thermostat or HVAC system to regulate temperature in the building.

20 Claims, 8 Drawing Sheets

(56) References Cited

U.S. PATENT DOCUMENTS

2021/0011443 A1* 1/2021 McNamara .......... F24F 11/0001
2021/0018211 A1* 1/2021 Ellis ........................ F24F 11/72
2021/0310685 A1* 10/2021 Kanematsu .............. F24F 11/67

OTHER PUBLICATIONS

Hui Zhang, Edward Arens, Yongchao Zhai. A review of the corrective power of personal comfort systems in non-neutral ambient environments. https://escholarship.org/uc/item/4kv4f2mk.

Tartarini, F., Schiavon, S., Cheung, T., Hoyt, T., 2020. CBE Thermal Comfort Tool: online tool for thermal comfort calculations and visualizations. SoftwareX 12, 100563. https://doi.org/10.1016/j.softx.2020.100563.

Kim, Joyce, et al. "Personal comfort models: predicting individuals' thermal preference using occupant heating and cooling behavior and machine learning." Building and Environment 129 (2018): 96-106.

Fitton, R., Swan, W., Hughes, T et al. The thermal performance of window coverings in a whole house test facility with single-glazed sash windows. Energy Efficiency 10, 1419-1431 (2017). https://doi.org/10.1007/s12053-017-9529-0.

Kim, Joyce, Stefano Schiavon, and Gail Brager. "Personal comfort models—a new paradigm in thermal comfort for occupant-centric environmental control." Building and Environment 132 (2018): 114-124. See section 5.

Dounis, Anastasios I., and Christos Caraiscos. "Advanced control systems engineering for energy and comfort management in a building environment—a review." Renewable and Sustainable Energy Reviews 13.6-7 (2009): 1246-1261.

Yang, Zheng, Ali Ghahramani, and Burcin Becerik-Gerber. "Building occupancy diversity and HVAC (heating, ventilation, and air conditioning) system energy efficiency." Energy 109 (2016): 641-649.

* cited by examiner

SYSTEM AND METHOD FOR DETERMINING HVAC SET POINTS

FIELD

The present disclosure relates generally to temperature control and in particular, to a system and method for determining HVAC set points.

BACKGROUND

Regulating temperatures in large buildings or even in residential dwellings can be difficult due to many factors, including climate, location, time of day, individual fans or heaters, and personal preferences. Traditional approaches to regulating temperature and ensuring comfort of the building occupants includes making a detailed model of the building, including a geometry of the building, heat flow, heating systems and cooling systems. The model is then used to control the building's heating, ventilation, and air conditioning (HVAC) systems, such as by programming the HVAC systems to achieve different temperatures at different times during the day.

In a traditional building management system, the HVAC system is programmed to achieve different temperatures at different times of the day. For example, see FIG. 1, which is a block diagram showing, by way of example, a prior art HVAC program for winter use. During a first time range A, the HVAC system can drop to a colder temperature at night and during early morning hours, such as when the building is unoccupied or the occupants are asleep. During a second time range B, the HVAC system is turned on or increases heat to the building to heat the building to a comfort set point before most of the occupants arrive. Finally, in a third time range C, the building maintains a comfortable set point temperature by adjusting centralized heating, if needed.

However, the traditional model adjustment approach requires that the model be accurate enough to predict building behavior many hours in advance and such models are expensive and time-consuming to construct. Also, this approach has trouble achieving comfort for all occupants, as one room may be too cold, while another room is too hot.

Finally, the traditional model approach is not ideal for controlling a building to achieve demand reduction of energy. For example, during extreme heat or cold weather, when all buildings are running their HVAC systems, the energy load may exceed maximum levels and cause an overload of the utility.

Accordingly, what is needed is a more efficient and less expensive approach for regulating temperature that satisfies the comfort preferences of occupants, while achieving greater energy savings and greater demand reduction, when needed. In some embodiments, such an approach will include personal comfort devices, such as personal heaters and coolers or motorized curtains in order to achieve these goals.

SUMMARY

An embodiment provides a system and method for determining HVAC set points. A present season is determined. An allowable temperature comfort range for each occupant in a room in a space is also determined. For each room, an energy saving set point temperature is calculated for the space based on the allowable temperature comfort range for that room. A set point temperature for the space is determined based on the energy saving set point temperatures for each of the rooms in the space. The set point temperature is provided to a thermostat or HVAC system to regulate temperature in the building.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Setting and regulating temperature to ensure occupant comfort is important. Many factors make regulating temperature difficult, including season, building location, occupants, outside temperature, humidity, and many others. Also important is the ability to regulate temperature efficiently, such as by saving or reducing the amount of energy used. Studies have shown that energy savings in central heating can be 10% or more for each degree Celsius that the building is allowed to be colder in the winter and for each degree Celsius that the building is allowed to be hotter in the summer. See, Hoyt. Additional studies have shown that occupants will tolerate a building that is up to 3C warmer, or more, if fans are available. See, Zhang. Curtains can reduce building temperature by as much as 6C with no additional work by the air conditioning system. Thus, fans and curtains can be used to achieve an energy savings of 30-60%, or more. Zhang also provides that personal heating devices can achieve comfort with building temperatures 2C to 10C cooler than normal depending on the device and environment. This can lead to a savings of 20% to more than 60%.

Not only can energy be saved by varying the building steady state temperature, but also by starting the heating or cooling process later in the day. This is possible because less time is required to heat a building to a lower temperature, such as in the winter, and less time to cool a building to a higher temperature, such as in the summer.

Identifying situations that are acceptable to allow a building to be hotter in the summer or colder in the winter and to change the timing of heating and cooling intervals can result in reduced energy usage, lower energy cost, and higher occupant comfort. Specifically, an approach for controlling building systems to account for individual occupant comfort while reducing the energy consumption helps to ensure occupant satisfaction and decrease energy fees, and also helps building managers and occupants who are interested in reducing the impact of buildings on energy consumption and climate change.

Figure 2:
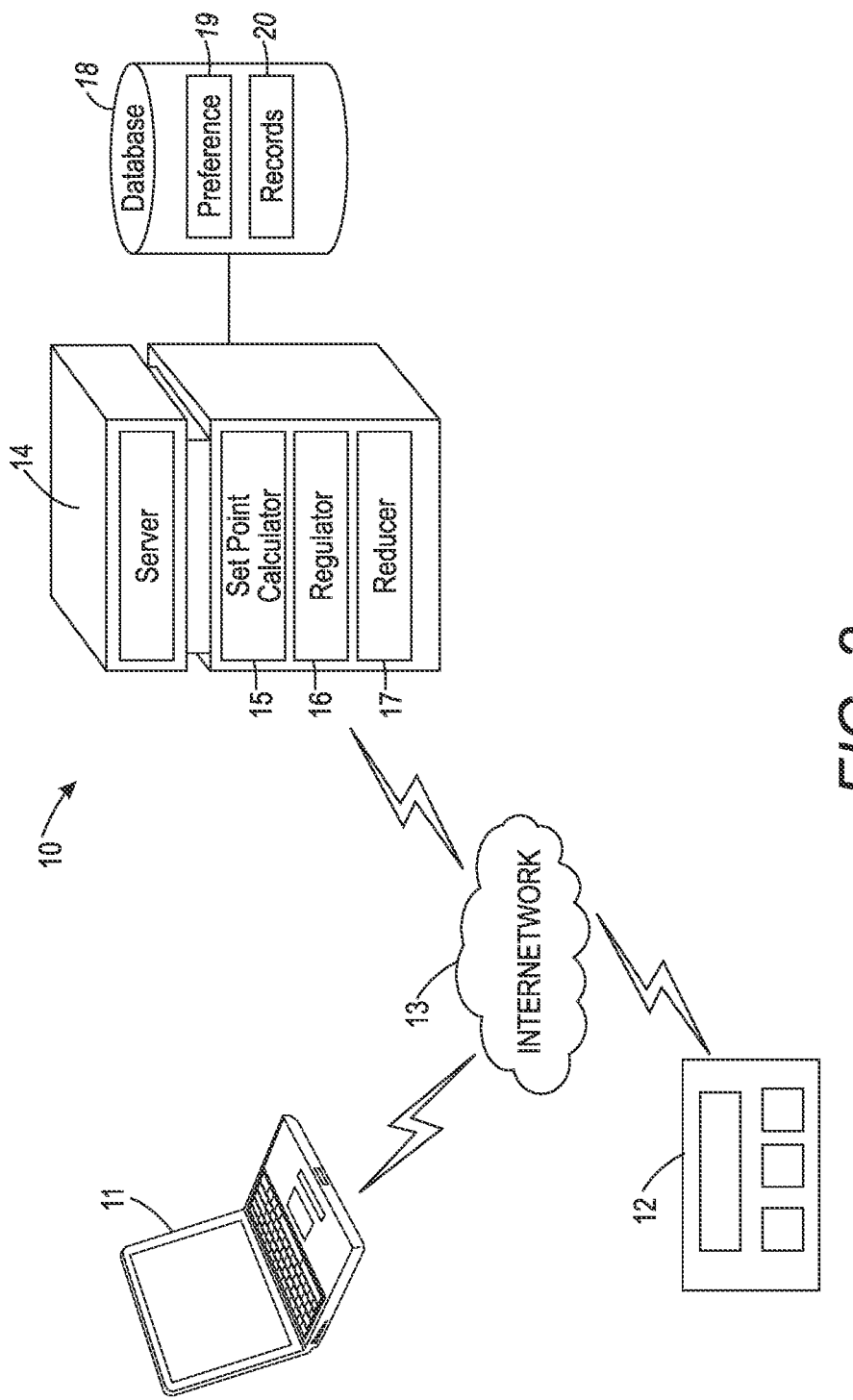
FIG. 2 is a block diagram showing a system for determining HVAC set points, in accordance with one example.

Temperature set points represent target values at which an HVAC system can maintain temperature. FIG. 2 is a block diagram showing a temperature control system 10 for determining HVAC set points, in accordance with one example. Data is collected and uploaded to a server 14, by a computer 11, via an Internetwork. The computer 11 can include a desktop computer, laptop, tablet, smart phone, or other type of mobile computing device, while the data can include factors, such as season, occupants, occupied rooms, offset ranges for the rooms, humidity logs, temperature logs, personal comfort devices, personal comfort ranges, temperature offset values for the occupied rooms, and the corrective power of the various personal comfort devices for a space in a structure, such as a multi-room zone in a building that includes the entire building or a portion of the building. The data can be collected by the computer itself or via a separate device, such as a thermometer, thermostat, RFID technology, or presence detector. Other types of devices are possible. The data can be stored as records 20 in a database 18 interconnected to the server 11, along with occupant preference 19 for temperature. In a further embodiment, the server 14 and database 18 can both operate in a cloud-computing environment.

The server 14 includes a set point calculator 15 to determine an allowable temperature range for each occupied room in a zone within the space, such as a building. A recommended set point for the space is calculated to result in acceptable temperatures for all rooms in the multi-room zone based on the allowable temperature ranges. For example, a single thermostat may work with all rooms on a first floor of a building, whereas, a different thermostat may work with all rooms on a second floor of the building. Allowable temperature ranges are determined for all rooms on the first floor and used to calculate a recommended set point for the thermostat on the first floor, while allowable temperature ranges are determined for all rooms of the second floor and used to calculate the recommended set point for the thermostat on the second floor.

The set point calculator can also determine set point times, which are times at which an HVAC system should turn on to heat or cool a building prior to arrival of the building occupants. Other set point temperatures at different times can also be determined. For example, winter heating can require an off hours set point where heating goes to a reduced value to save energy. Also, a summer cooling scheme can be implemented where higher temperatures are tolerated in the middle of the day, but the system enforces cooler temperatures and may even apply some heating when the outside temperatures drop. Thus, many set point temperatures, which correspond to outside temperatures, different outside humidity values, and different offices being occupied, can be determined throughout the day.

Initially, each set point is determined to get all rooms in a space into a corresponding comfort range at a target time while also satisfying any other constraints on the system as a whole, such as reducing energy consumption and allowing a margin of safety so no room is too close to an upper or lower temperature in the comfort range, as well as other constraints. During a day, set points can be recomputed more than once, even continuously, if desired. However, in a further embodiment, recomputing the set point may only be necessary, for example, when an occupant arrives or leaves a room or zone in the space or an owner or facilities manager changes a setting, such as a minimum temperature that will be allowed in the building during a season, such as to protect equipment, plants, or pipes. Other examples include recomputing the set point when a personal comfort device is added or removed from a room, changes in outside temperature mean that a longer or shorter time will be needed to heat or cool the building to reach the target time, or a power grid needs a reduction in power consumption during a particular time period. The set point times and temperatures allow HVAC systems to minimize energy use under the constraint that room temperatures must be within the personal comfort range of each occupant.

The server 14 also includes a regulator 16 to communicate the recommended set point temperature to a thermostat 12 or HVAC system itself (not shown) and a reducer 17 to determine a reduction in energy, such as when the demand for energy is high.

Figure 3:
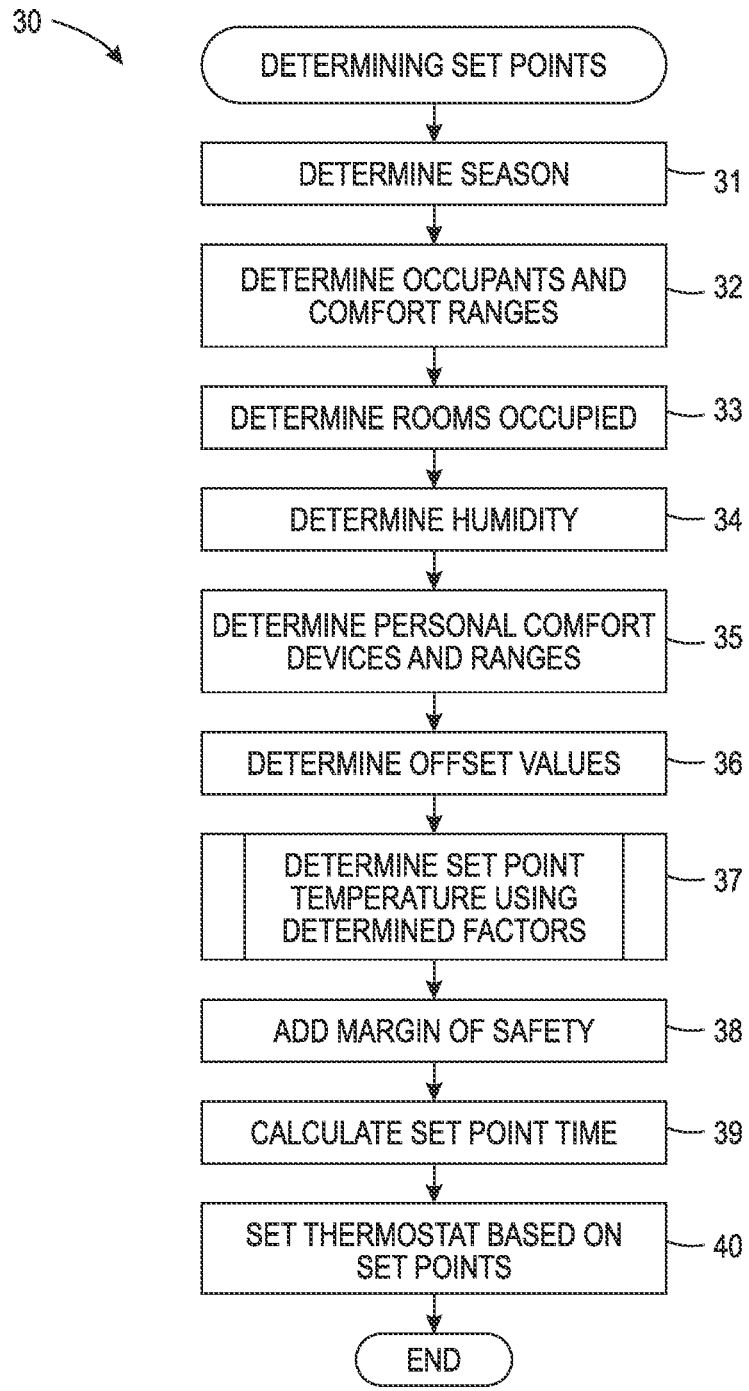
FIG. 3 is a flowchart showing a method for determining HVAC set points, in accordance with one example.

Temperature set points can be determined based on season and can consider occupant comfort range, as well as personal comfort devices, including the number, type, and corrective power of the personal comfort devices. FIG. 3 is a flowchart showing a method 30 for determining HVAC set points, in accordance with one example. Many factors related to temperature control are determined and one or more of the factors can be used to automatically adjust the set point temperature. A season (step 31) and occupants present in a building (step 32) at a given time can be determined, along with occupant comfort range. Identifying the season helps determine whether heating or cooling is going to be needed to help adjust temperature to the recommended set point, whereas identifying the occupants can be useful to determine the comfort ranges that must be considered in computing the set point temperature.

Occupants can be automatically detected using facial recognition or RFID badges, as well as by thermal imaging or motion sensors. Other types of technology to detect an occupant are possible. When optical imaging is available, the clothing of an occupant can be detected and the set point can be adjusted in accordance with detection of the occupant. For example, a salesperson wears casual clothes most days, but a full suit on days with client meetings. In the summer, the temperature control system can detect the full suit and lower the temperature relative to the typical summer maximum set point.

Offices in which an occupant is present are also determined (step 33). The presence of an occupant in an office or at a cubicle in an office can be determined using a list of room assignments. In a further embodiment, days and hours generally worked by the occupant of that office can also be considered to determine whether or not an occupant is present.

Each occupant can be associated with a range of temperatures at which they are comfortable. For each occupant, a combination of values for temperature, humidity, air flow, and clothing type, as well as other elements can be determined as part of each occupant's personal comfort profile. In one embodiment, a range of the specific combinations of values can be considered comfortable for that occupant. For example, for a given humidity and type of clothing, a range of temperatures that will be comfortable for a given occupant can be determined. If the type of clothing is not known, the algorithm for determining occupant comfort can proceed by assuming average clothing warmth or by restricting to a range that would be comfortable for any typical type of clothing. Also, occupants may make minor adjustments to their clothing if the room is a little too warm or too cold.

The humidity in each room (step 34) and the availability of personal comfort devices in each room (step 35) can also be determined. As described above, identifying which rooms are occupied and by which occupant allows the temperature control system to consider personal comfort for each occupant with respect to the specifics of the room, such as whether the room tends to run colder or hotter than the set point temperature. Also, as described above, humidity can be taken into account by using those temperature ranges that are comfortable for each occupant, given the current humidity.

Personal comfort devices can include heaters, fans, motorized curtains, motorized blinds, motorized vents, portable coolers, dehumidifers and other devices. The personal comfort devices can be used to ensure occupant comfort and reduce energy consumption on cold days, even if the building temperature falls or the central heating system is set at a lower set point temperature. Likewise, personal comfort devices, including fans, can be used to ensure occupant comfort and reduce energy consumption on hot days, even if the building temperature rises or the central cooling system is set at a higher set point temperature. When energy savings is the sole goal, the total energy used by all personal comfort devices to compensate for a modified set point temperature must be less than the energy saved by modifying the set point. In cases where occupant comfort is the goal and energy savings is secondary, the algorithm for determining set point temperatures can choose a set point that uses somewhat more energy in order to ensure that all rooms are squarely within the personal comfort ranges of their occupants. The personal comfort devices can also be used to preserve occupant comfort during times when the central HVAC system has not yet succeeded in achieving the temperature requested by the set point. This can happen, for example, if an occupant arrives earlier than expected or if there are unusual weather conditions that are not yet taken into account in the estimates of the time required to heat and cool the building with the central HVAC.

Offset ranges for each occupied room can be determined (step 36) to account for variability in room temperature. For instance, not all rooms may reach the same steady state temperature. In one example, a thermostat is set at 22C, and when the building reaches steady state, some rooms settle at 22C, while others may be slightly warmer or cooler. Room A may settle at an offset range of −1 to 1 C from the set point temperature, while Room B tends to settle at an offset range of 0 to 2C. The ranges can be tightened or made more accurate by taking season into account. For example, during summer, Room A narrows and tends to have a range of 0 to 1C.

The offset ranges can be used to adjust the set point temperature, as well as to identify outliers for repairs or retrofits, including installing additional insulation or replacing windows. Additionally, the offset ranges can be used to match occupants with rooms so that occupants who prefer warmer temperatures are placed in rooms that tend to get warmer than the set point temperature, while occupants who prefer cooler temperatures are placed in rooms that tend to be cooler than the set point temperature.

Once values for the factors are determined, the recommended set point temperature can be determined (step 37). Determining the recommended set point temperature is described below in further detail with respect to FIG. 5. A margin of safety can be added (step 38) to the recommended set point temperature to ensure that patient comfort ranges are not exceeded.

A set point time can be calculated (step 39), which provides a time at which the HVAC system is scheduled to turn on or attempt to reach the recommended set point temperature. Determining the set point time is described below in further detail with respect to FIG. 5. Once the recommended set point temperature and time are determined, the data values are provided (step 40) to a thermostat that controls the HVAC system or to the HVAC system itself for implementation. Although the above description implies a sequential process of steps, at least a portion of the steps can be performed sequentially or in a different order.

Figure 4:
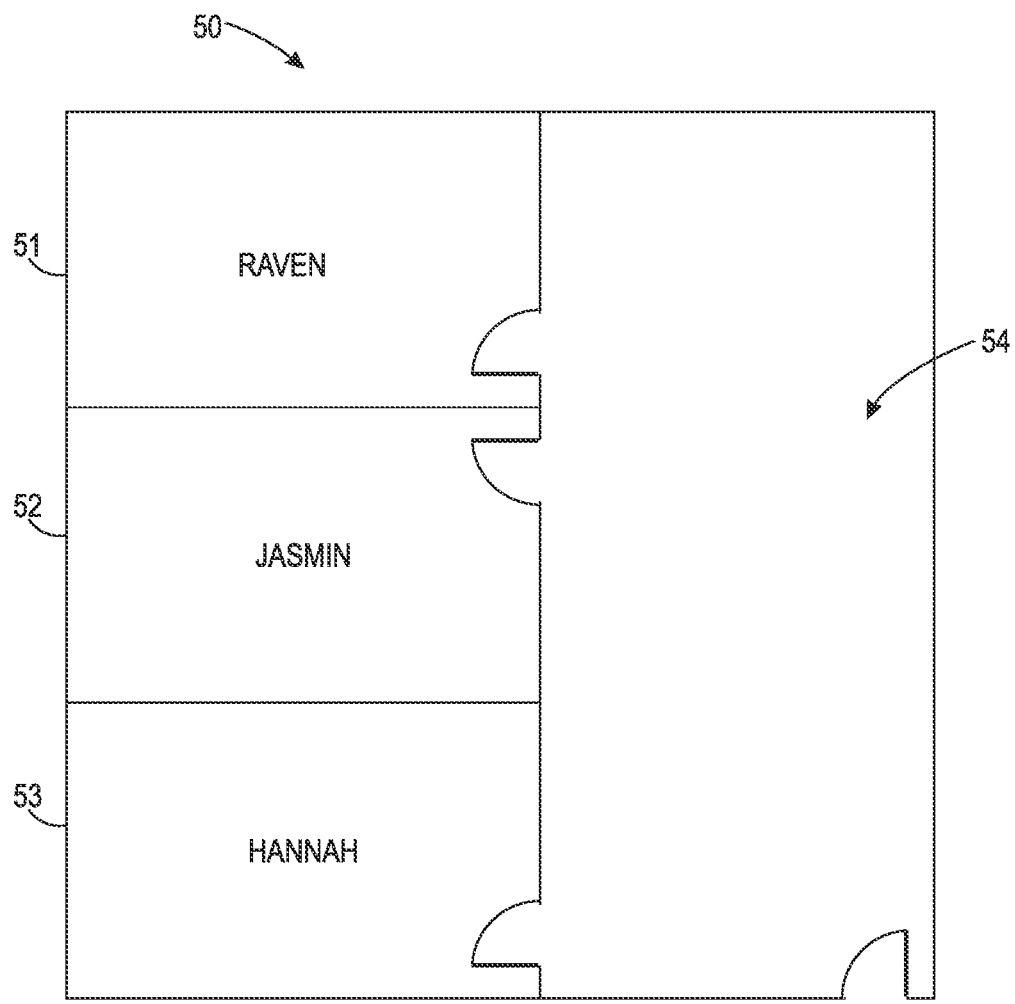
FIG. 4 is a block diagram showing, by way of example, a building with three offices.

To optimize energy savings, set point times and temperatures for the central HVAC system are selected to minimize energy use based on the requirement that all occupants are within the range of their personal comfort zone. FIG. 4 is a block diagram showing, by way of example, a building 50 with three offices. The offices 51-53 adjoin a hall 54. A first office 51 belongs to Raven, a second office 52 to Jasmin, and a third office 53 to Hannah. The personal comfort ranges for Raven, Jasmin, and Hannah are provided in the table below. Hannah has average comfort preferences. Jasmin prefers a warmer office, and Raven prefers a cooler office.

TABLE 1

Personal comfort ranges

| Name | Humidity | Low Temp | High Temp | Corrective Power (Winter) | Corrective Power (Summer) |
|---|---|---|---|---|---|
| Hannah | Low | 19° C. | 25° C. | 3° C. | 3° C. |
| (average) | High | 20° C. | 24° C. | 3° C. | 3° C. |
| Jasmin | Low | 20° C. | 26° C. | 4° C. | 3° C. |
| (warmer) | High | 21° C. | 25° C. | 4° C. | 3° C. |
| Raven | Low | 18° C. | 23° C. | 3° C. | 3° C. |
| (cooler) | High | 19° C. | 22° C. | 3° C. | 3° C. |

Given the preferences in Table 1, the recommended set point temperature of 17° C. is the coolest temperature assuming that rooms 51, 52 have an offset of zero degrees from the set point temperature, that humidity is high, and that the season is winter. The recommended set point temperature of 17° C. works due to personal comfort devices of the occupants, which are powerful enough to heat each room to the occupant's comfortable temperature range. The amount of temperature change that a personal comfort device can achieve is the corrective power of that personal comfort device. Thus, at a set point temperature of 17° C., Hannah's and Raven's offices can reach a temperature of 20° C. based on the 3° C. corrective power of their respective personal heaters, while Jasmin's office can reach 21° C. based on the 4° C. corrective power of Jasmin's personal heater. The temperature of all three rooms are within the occupant's comfort range as shown in Table 1. However, the values for Hannah and Jasmin are at the bottom of their ranges and thus, the set point temperature cannot be less than 17° C.

If Jasmin and Hannah have offices that are reliably 1° C. warmer than the set point temperature, such as because their office ducts work better than others in the building or because their offices are near a boiler room, their offices would then be 21° C. and 22° C., while Raven's office remains at 20° C. In this scenario, the recommended set point can be reduced, for instance to 16° C., while still maintaining office temperatures within the personal comfort range of all the occupants.

With the personal comfort devices on, each office may differ in temperature from the building set point temperature and from other offices. However, each office is at a temperature that is within the personal comfort range of the occupant in that office. Utilizing the personal comfort devices, the approach for determining set points allows the personal comfort ranges to be met without having to increase the building set point temperature, thereby saving energy consumption.

In a different example, the set point temperature is 23° C. on a summer day with high humidity. Each of the offices has a personal comfort device, such as a fan, that has a corrective power of 3° C. to compensate for the heat. All three offices settle at a temperature of 23° C. Hannah and Jasmin's offices are within their personal comfort range, and so they have no need for the personal comfort devices, while Raven's office is hotter than her maximum comfort temperature, which is 22° C. Accordingly, the fan in Raven's office can be turned on to reduce the temperature in her office by 3° C. to a temperature of 20° C., which is in her comfort range.

In an effort to reduce energy consumption, the building's set point can be allowed to rise to 25° C., saving about 20% of the power consumption for the HVAC. The personal comfort devices can bring the temperature of each office down to 22° C. and all occupants are comfortable.

Further, if dehumidification is available, the building set point can be 26° C., saving an additional 10% in power consumption. For instance, a dehumidifier can be added to Raven's office to bring the humidity level from high to low. Alternatively, Raven's office can be equipped with a larger, more powerful fan that has a corrective power of 4° C. Recommendations for the use and placement of personal comfort devices can be made automatically using the temperature control system described herein.

Figure 5:
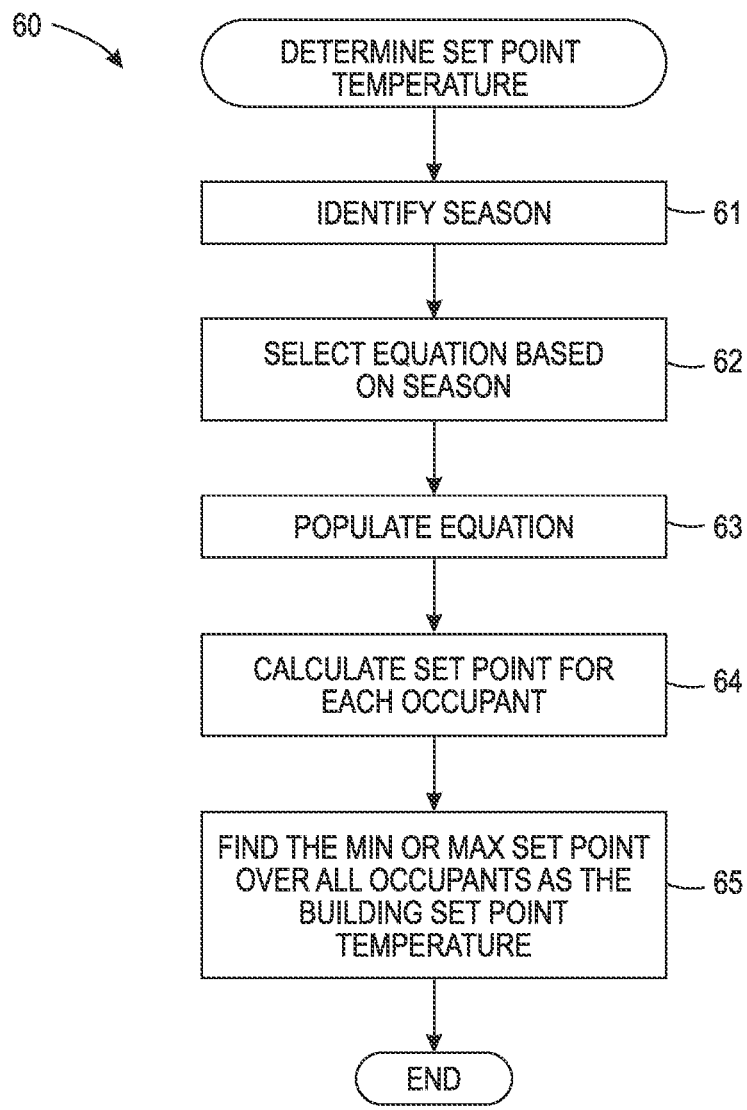
FIG. 5 is a flowchart showing, by way of example, a process for determining a set point temperature.

The set point temperature for a building can be set to reduce energy consumption, while ensuring that each occupant's comfort range can be satisfied at that temperature, such as by using personal comfort devices. FIG. 5 is a flowchart showing, by way of example, a process 60 for determining a recommended set point temperature. A season during which the set point temperature will be used is optionally determined (step 61). Identity of the season can be determined from a date on which the set point will be used. However, if the season itself is not available, a determination can be made as to whether the outside temperature remains below the comfort ranges, whether the outside temperature goes above the comfort ranges, or is in between. If the outside temperature is lower than the comfort ranges, the winter approach can be used, while if the outside temperature is above the comfort ranges, the summer approach can be used. In a further embodiment, the central HVAC can be turned off or set to an average comfortable temperature, using the personal comfort devices, if needed, to make minor adjustments.

An equation for calculating the set point is then selected based on the identified season (step 62) and the equation is populated using determined values for the factors described above with respect to FIG. 2, including occupants, rooms, humidity, personal comfort devices and their corrective power, offset ranges, and other factors. The acceptable temperature range for each occupant in the building is calculated (step 64) using the factor values and selected equation. Subsequently, depending on the season, a maximum or minimum set point for the building is determined (step 65) based on the individual acceptable temperature ranges for the occupants, as further described below.

In one example, a recommended set point temperature is to be calculated for use during the winter season. Data for the factors is collected and subsequently used to calculate the building set point. For instance, the occupants O are determined, along with a set of rooms R, which are occupied by the occupants. An assumption can be made that occupant $o_i$ will occupy $r_i$. An interior humidity $H_i$ can be determined, as well as the personal comfort devices (PCDs) available in each of the rooms that will be occupied. Based on these factors, the recommended set point temperature can be calculated, in the winter, as follows:

1. For each occupant, $o_i$ in O, lookup $o_i$'s range of comfortable temperatures for humidity $H_i$. Take the lowest temperature in that range $T_{iL}$.
2. For each room, $r_i$ in a zone or building R, look up $r_i$'s offset range. Designate the lowest offset in that range $D_{iL}$, which can be negative.
3. For each room, $r_i$ in R, look up the corrective power of the PCDs in $r_i$ for increasing effective temperature as $CP_i$ in degrees Celsius. Here, an assumption can be made that $CP_i$ is always positive.
4. For each room, $r_i$ in R, compute $S_i = T_{iL} - CP_i - D_{iL}$ as an energy savings set point temperature, such as a minimum set point temperature, for a zone of a building or a building itself in which the rooms are located that will allow occupant $o_i$ to be comfortable in room $r_i$.
5. Designate the maximum $S_i$ over all i as $S_{max}$. $S_{max}$ is the minimum set point temperature for zone or building R that will allow all occupants in O to be comfortable in their associated rooms in the zone or building R. Specifically, $S_i$ is a temperature that if applied to the whole zone or building R will result in $r_i$ being comfortable for its occupant or occupants. Each individual occupant and corresponding room is represented by i. Multiple occupants in a single room can be accommodated by determining that temperature range that will allow all occupants of the room to be comfortable and using that range in place of the range for a single occupant.

During the summer months, the recommended set point temperature can be determined as follows:

1. For each occupant, $o_i$ in O, look up $o_i$'s range of comfortable temperatures for humidity $H_i$. Designate the highest temperature in that range as $T_{iH}$.
2. For each room, $r_i$ in a zone or building R, look up $r_i$'s offset range. Designate the highest offset in that range as $D_{iH}$.
3. For each room, $r_i$ in R, look up the corrective power of the PCDs in $r_i$ for reducing effective temperature as $CP_i$ in degrees Celsius. Here, an assumption can be made that $CP_i$ is always positive, where the value indicates the amount of cooling that can be achieved.
4. For each room, $r_i$ in R, compute $S_i = T_{iH} + CP_i - D_{iH}$ as an energy savings set point temperature, such as a maximum set point temperature, that will allow occupant $o_i$ to be comfortable in room $r_i$.
5. Find the minimum $S_i$ over all i as $S_{min}$, which is the maximum set point temperature that will allow all occupants in O to be comfortable in their associated rooms in the zone or building. Specifically, $S_i$ is a temperature that if applied to the whole zone or building will result in $r_i$ being comfortable for its occupant or occupants. Multiple occupants in a single room can be accommodated by determining that temperature range that will allow all occupants of the room to be comfortable and using that range in place of the range for a single occupant.

Figure 6:
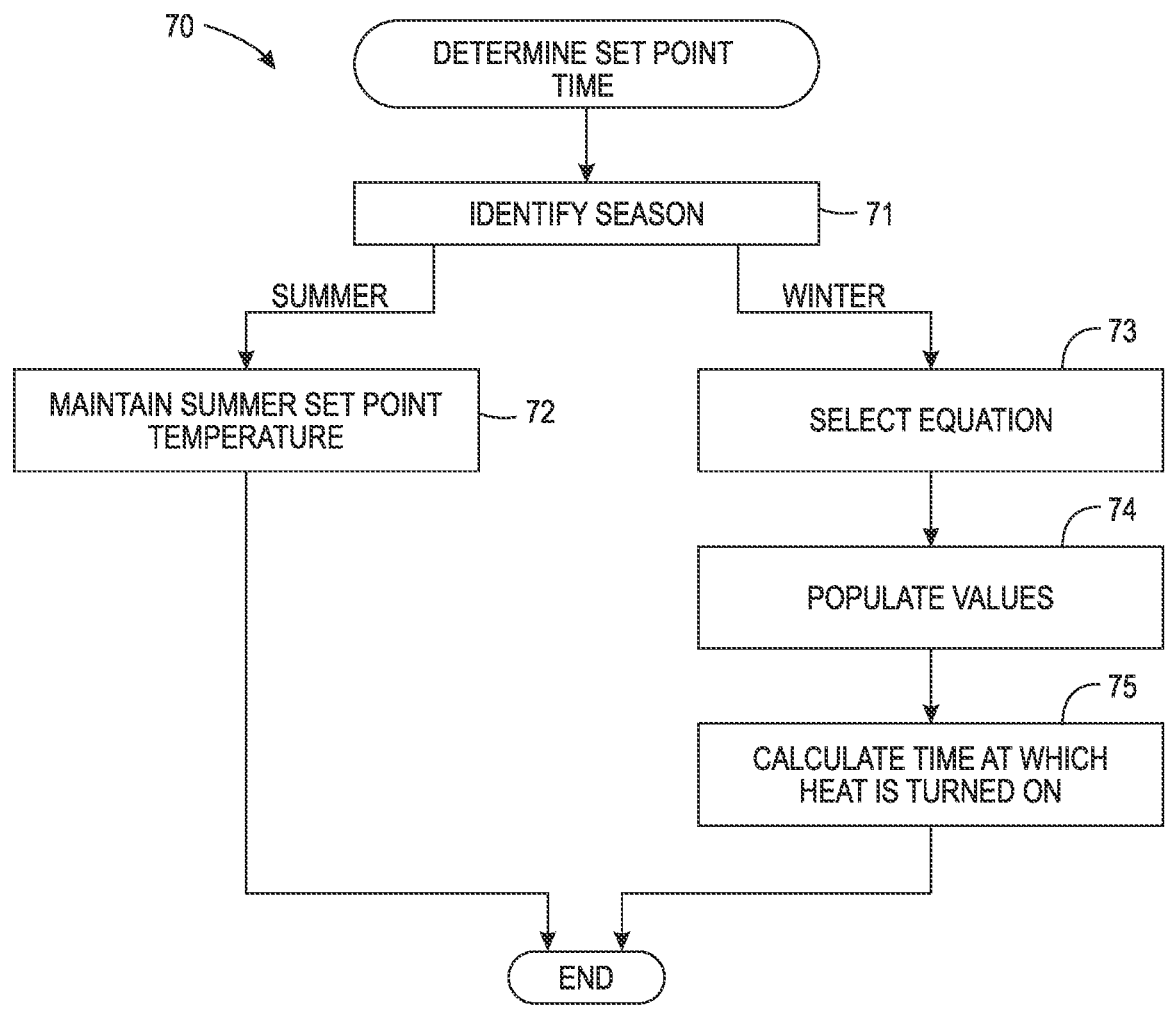
FIG. 6 is a flowchart showing, by way of example, a process for determining a set point time.

Once the set point temperature for the building is calculated, a set point time is determined. The set point time is a time at which the HVAC system is activated to help the building get to the set point temperature prior to arrival by the occupants. FIG. 6 is a flowchart showing, by way of example, a process 70 for determining a set point time. A season is identified (step 71) during which the set point time is to be used. If the season is summer, the summer set point temperature can be maintained (step 72) at all times and no set point time is needed.

Specifically, in the summer, outside temperatures tend to cool off at night so that air conditioning may not be needed at night. If not needed, the air conditioning can automatically turn off. As the temperature begins to rise in the morning, the HVAC system can work to regulate the temperature in the building and ensure that the set point temperature is not exceeded. Thus, in this case, the recommended summer set point mentioned above can simply be active 24 hours per day. During most of the day, the air conditioning will have no effect, as exterior temperatures will be below the set point and the building interior temperatures will stay below as well. However, in other geographical regions, the outside heat may persist into the night. In this case, the building temperature can be allowed to rise somewhat at night when the occupants are not present and then, the temperature can be set lower prior to arrival of the occupants. For such climates, the set point can be changed at two times during the day, including at a time long enough before the occupants arrive to allow for cooling and at a time right after the occupants leave, when it is no longer necessary to keep the building as cool.

In some climates, evening or night time temperatures may drop so far that heating is needed to achieve occupant comfort. In this case, the winter algorithm can be used to control heating during the cooler times of the day, if occupants are expected during those hours.

In the winter, a set point time is helpful to conserve energy since in the evening and nighttime when no occupants are present, the heat can be reduced or turned off and the temperature can be allowed to drop below the daytime set point temperature. To determine the set point time, knowledge regarding how quickly a building can be heated from one temperature to a second, higher, temperature or how quickly a building can be cooled between two temperatures should be known. The time periods for heating or cooling can be collected over time and can include a range of times.

For example, based on data obtained from monitoring the temperature of the building at particular times throughout the day, a range of times for heating or cooling the building can be estimated. In one instance, the building can be heated from 17° C. to 22° C. within 40 to 60 minutes. The range can be narrowed by taking into account additional factors, such as date or weather forecast, as well as other factors. Narrower and more accurate time ranges can result in more energy savings. For example, if the outside temperature is 16° C. when heating is started on a day in early March, a narrower range of heating times is determined, such as 40 to 50 minutes.

To determine the set point time in the winter, an equation is identified (step 73) and values for the following factors are determined, including the occupants O present in the building, an arrival time $t_A$ of the first occupant or occupants to arrive, the calendar date C, the external temperature $T_O$ and humidity $H_O$, the current set point temperature $T_S$, and the minimum set point temperature $S_{max}$. The set point temperature and minimum set point temperature can be determined as described above with reference to FIG. 5.

The factor values are populated (step 74) in the equation and the set point time is calculated (step 75) according to the following steps:
1. Look up the historical range of heating times from $T_S$ to $S_{max}$ given C, $T_O$ and $H_O$. Pick the largest number in this range, $t_{max}$.
2. Compute $t_0=t_A-t_{max}$ as the latest time that can be used to start heating the building and still be sure the building will be warm enough by the time the first occupants arrive.

Once the recommended set point temperature and set point time are calculated, the values can be provided to the HVAC system or thermostat for use by the HVAC system. However, a margin of safety can be added to the set point temperatures to ensure occupant comfort, especially since the temperatures are calculated using algorithms designed to save the maximum amount of energy by allowing room temperatures in the building to approach the edge of occupant comfort. As a result, there is a slight risk that some occupants will be uncomfortable if building temperature control is less than perfect. Accordingly, a margin of safety $\in$ is included by adding a small offset to $S_{min}$ and $S_{max}$, making the set point a little warmer in the winter and a little colder in summer.

The ability to save energy depends on the attributes of those rooms and occupants that are being pushed closest to the boundaries of personal comfort. For example, in the winter, some rooms are colder than others due to factors such as the room's location, the amount of heat received by the room, or the amount of insulation available in the room. Also, some occupants are more sensitive to the cold than others.

The most challenging rooms can be determined and improved to help ensure that all rooms are reaching the set point temperature. For instance, in the winter, the most challenging room can be the coldest room or the room that has the most cold-sensitive occupant. The most challenging rooms can be identified based on the $S_{max}$ value, which represents the minimum set point temperature for the zone or building. Specifically, in the winter, the most challenging rooms have a set point temperature $S_i$ that is equal to $S_{max}$. Similarly, in the summer, the most challenging rooms are those where $S_i=S_{min}$.

The rooms in a building can be ranked, such as from most challenging to least challenging or vice versa, by computing $|S_{max}-S_i|$ for heating and $|S_{min}-S_i|$ for cooling. The smaller the value, the more challenging the room is considered to be. In one embodiment, the most challenging rooms can be improved. Such rooms selected for improvement can be determined based on a predetermined number, such as the five most challenging rooms or the top 5% most challenging rooms. Alternatively, a threshold can be used to identify the most challenging rooms for improvement. Other techniques for selecting the most challenging rooms are possible.

During a summer heat wave, a utility company may ask customers to reduce energy demand for a given time period to reduce the load on the utility. There are several ways to achieve the demand reduction, including reducing the margin of safety ¿ to zero to increase energy savings, while preserving occupant comfort. Additionally, occupants can be asked to tolerate a few hours of less than comfortable conditions, using a larger comfort range for each occupant. The larger comfort range can be determined based on data collected over time and based on conditions that may be a little uncomfortable, but tolerable, for each occupant. Also, energy reduction can be achieved by providing the most challenging rooms with dehumidifiers to allow adjustment of the set point while preserving comfort. For instance, changing the humidity of the most challenging rooms shifts the comfortable temperature range for each room, usually to lower temperatures. Using the new shifted temperature ranges, $S_{max}$ or $S_{min}$ can be recomputed and a new set point with reduced demand can be applied. After the new temperature ranges are computed, the most challenging rooms can again be determined as there may be different challenging rooms. Dehumidifiers can be provided to the most challenging rooms and the set point temperature can be modified.

As described above, factors, such as personal comfort device availability, occupant room assignments and HVAC capabilities, are used to compute set point times and temperatures. However, a variant of the algorithms can be used to recommend changes to the building or its occupants to improve efficiency or achieve a particular set point temperature goal, such as a desired temperature $SD_{max}$. In one embodiment $SD_{max}=S_{max}$. However, other values for $SD_{max}$ are possible, such as $S_{max}+\in$, where $\in$ is the margin of safety that ensures the occupants are comfortable even when some of the parameters of the model are not exact.

Changes can be recommended. For example, the thermostat can be set to a desired temperature $SD_{max}$ in winter, while having all occupants be comfortable, according to the following steps:

1. Find all rooms where $S_i>SD_{max}$. When $S_i>SD_{max}$, the comfort in room $r_i$ in the winter requires that the zone or building set point be at least $S_i$, which would require that $SD_{max}$ be increased to at least $S_i$. If $SD_{max}$ is not to be increased, then room $r_i$ needs to be changed to prevent an increase of the set point.
2. Compute the difference $S_i$-$SD_{max}$ as the additional corrective power needed to reach the occupant comfort levels.
3. Consider the addition of heaters, dehumidifiers, curtains, and wall insulation in each room.
4. Consider putting an occupant who is less sensitive to cold in one of the rooms where $S_i>SD_{max}$
5. Determine whether some combination of considerations can be used so that $S_i \leq SD_{max}$. In this case, the set point temperature is achievable
6. Do the same for all rooms having $S_i>SD_{max}$.
7. If all rooms can be brought into occupant comfort range, the goal of the set point temperature is achievable and the changes to recommend are known. For example, if the zone or building set point is no more than $SD_{max}$ and $S_i$-$SD_{max}$ is a positive number n, then a personal comfort device should be added to $r_i$ with a corrective power of at least n. However, other examples to bring rooms into an occupant comfort range are possible.

Further, a maximum amount of energy savings can be achieved given a known budget for adding personal comfort devices. For example, if a certain amount of money M is available to purchase personal comfort devices then the following steps can be performed:

1. Find the most challenging room.
2. Determine whether enough personal comfort devices can be purchased for amount M or less so that the set point temperature required by the most challenging room becomes lower in winter or higher in summer than the second most challenging room.
3. If not, no improvement may need to be made to some of the rooms. For example, in one embodiment, until $S_i>S_j$, there is no point in starting to work on second most challenging room j; the full improvement will come from reducing $S_i$ in that case. Specifically, as long as $S_i<S_j$ (in summer), $S_i$ determines the set point temperature for that zone or building and thus, determines the energy savings of the central HVAC system. The occupant of $S_j$ can be made more comfortable by adding more PCDs to room $r_j$, which may be considered an improvement, but would not improve the energy savings of the central HVAC. Once $S_i>S_j$, the two most challenging rooms can be adjusted together with $(S_i-S_j)$ until they reach the level, $S_k$, of the third most challenging room. Specifically, consider the top two most challenging rooms and determine whether enough personal comfort devices can be purchased for amount M so that both of the rooms become less challenging than the third most challenging room.
4. If so, continue with the next most challenging room k, increasing k by 1 in each round until a value of k is found where the personal comfort devices that can be purchased for the remaining portion of amount M are not sufficient to make all k rooms better off than room k+1. At that time, stop and propose buying enough personal comfort devices so that the first (k-1) rooms are as good as room k. With any remaining money, increase the PCDs in the top k rooms so as to make their $S_i$ values as high as possible in the summer or as low as possible in the winter, subject to the constraint that $S_i=S_j=S_k$ and so on. The stopping condition can be $S_i=S_j=S_k$ and so on for all k of the k most challenging rooms, where $S_i$ is decreased (in winter) or increased (in summer) as much as possible given the budget.

Further, in some buildings, the amount of air that flows into each room can be adjusted, such as via adjusting vents. The vents can be manual or motorized. By opening some vents more than others, particular rooms can be heated or cooled more than others to allow adjustment of the temperature displacement of individual rooms. For example, if a particular room tends to be colder than average, the heating may be increased to that room relative to other rooms so the temperature in the room is comparable to other rooms.

The adjustment of air flow can be used to improve energy savings. A most challenging room can be identified and subsequently improved by changing the vent positions of at least a portion of the rooms in the heating or cooling zone of the most challenging room. The value $S_i$ for the room should change allowing $S_{max}$ to go down in the winter or allowing $S_{min}$ to go up in the summer, which can result in additional energy savings. Once the $S_i$ for the room changes enough that the room is no longer the most challenging room, additional vent modifications can be made to improve $S_i$ for the next most challenging rooms until the vents are achieving their maximum benefit and a new $S_{max}$ or $S_{min}$ is established.

In a further embodiment, the vents can be positioned so that $S_i=S_j$ for all of the rooms in a particular zone. In such a scenario, $S_{max}=S_i$ for all of the rooms and $S_{max}$ will be as low as possible. If this scenario is not possible, e.g., because one room is so cold and another room is so hot that no set point temperature in combination with vent settings can make the occupants of both rooms comfortable, then one can use the algorithm as originally described for finding the k coldest or hottest rooms and adjusting the vents in that zone to increase k as much as possible until adding the next room makes a solution impossible. Adjusting the vents allows modification of the offset values of the rooms from the set point temperature, but the vents can only be adjusted to a point because there may be a limited supply of hot air available. If, for example, the goal, such as in the winter, is to provide as little heat as possible over the whole zone, while achieving maximum comfort, the vents can be adjusted to allow $S_{max}$ to be as small as possible, with $S_i=S_j$ for the k coldest rooms. If some of the rooms are too hot, then, a score can be defined for how uncomfortable each occupant is and the set point that minimizes the discomfort score over all occupants can be selected, where some occupants will be too cold and some will be too hot, and perhaps, some will be comfortable.

Figure 7:
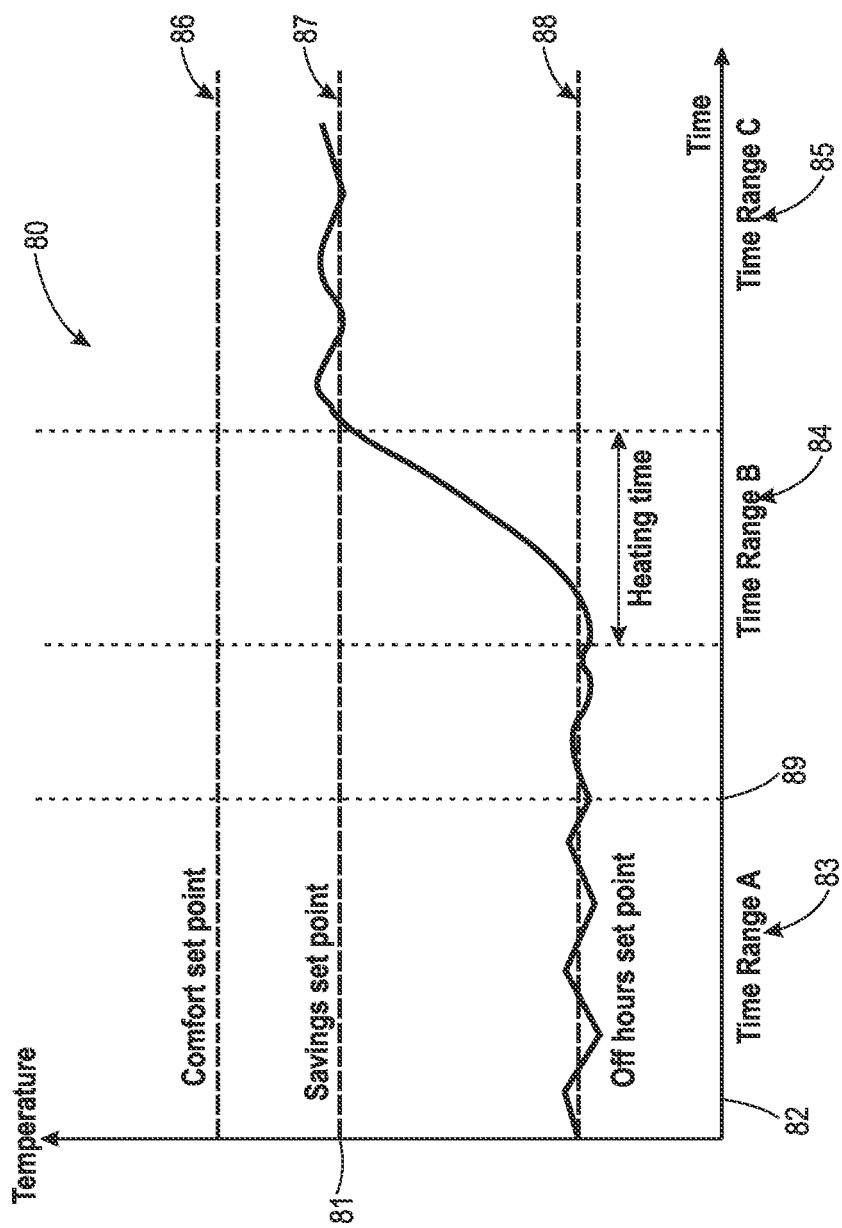
FIG. 7 is a block diagram showing, by way of example, a graph of heating results using modified set point temperatures.

The recommended set point temperatures can help optimize energy savings. As described above, the use and consideration of personal comfort devices can help to modify a set point temperature to save energy. FIG. 7 is a line graph showing, by way of example, a graph 80 of heating results using modified or recommended set point temperatures. The graph 80 includes an x-axis 82 representing time and a y-axis 81 representing temperature. When personal comfort devices are used, the temperature of a space, such as a building, does not need to be as warm, such as in the winter, as the temperature determined without consideration and use of the personal comfort devices, as indicated by the traditional comfort set point 86 and recommended or savings set point 87. In a time range C 85, energy is saved due to the reduced temperature difference between inside and outside environments based on the savings set point.

Figure 1:
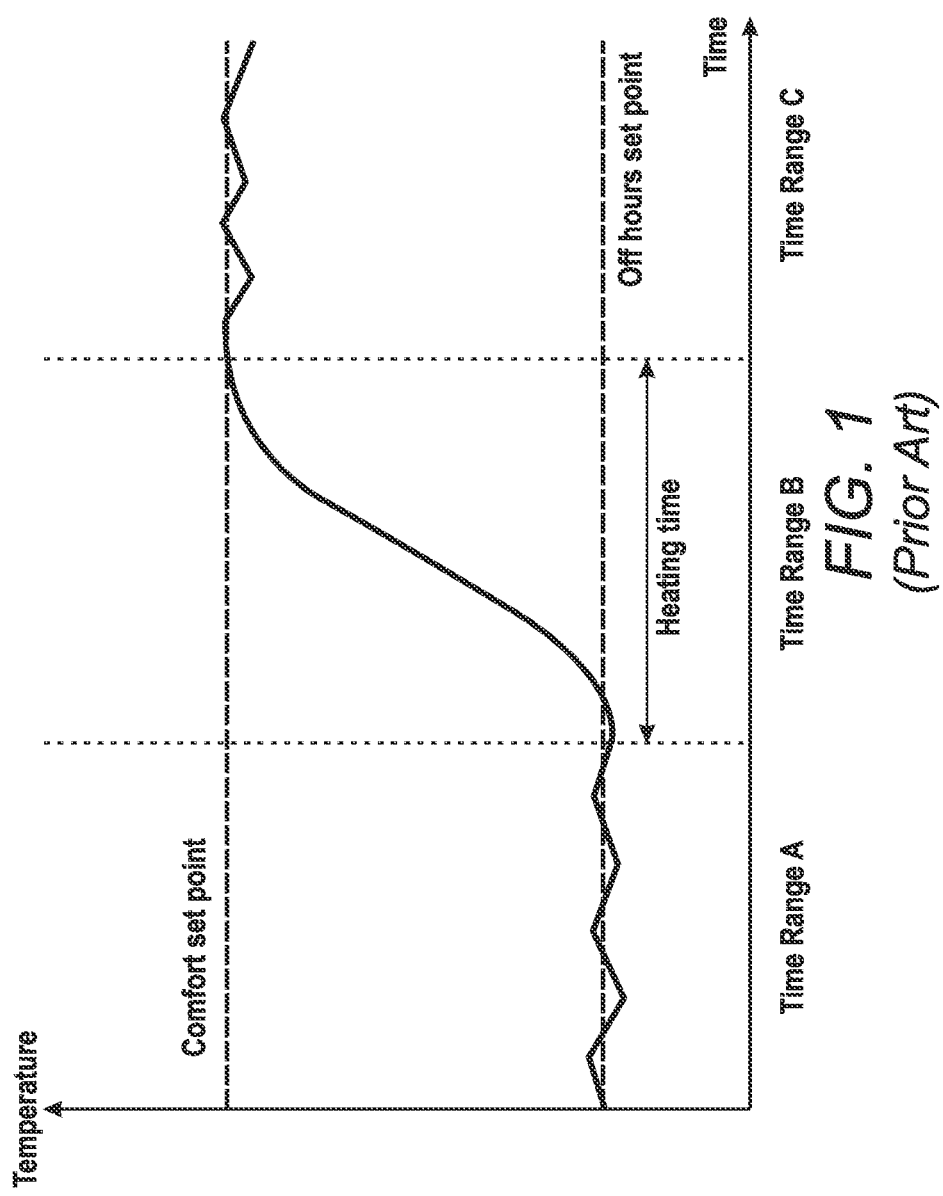
FIG. 1 is a block diagram showing, by way of example, a graph of a prior art HVAC program for winter use.

Also, compared with a traditional schedule, such as provided in FIG. 1, less time is required to heat the building in the morning, so time range B 84 is shorter, making time range A 83 longer, as shown by the traditional start of time range B 89. The scenario represented by the graph saves additional energy because the building is running at the off-hours low energy set point 88 for a longer period of time than traditionally, as described below with respect to FIG. 7.

Figure 8:
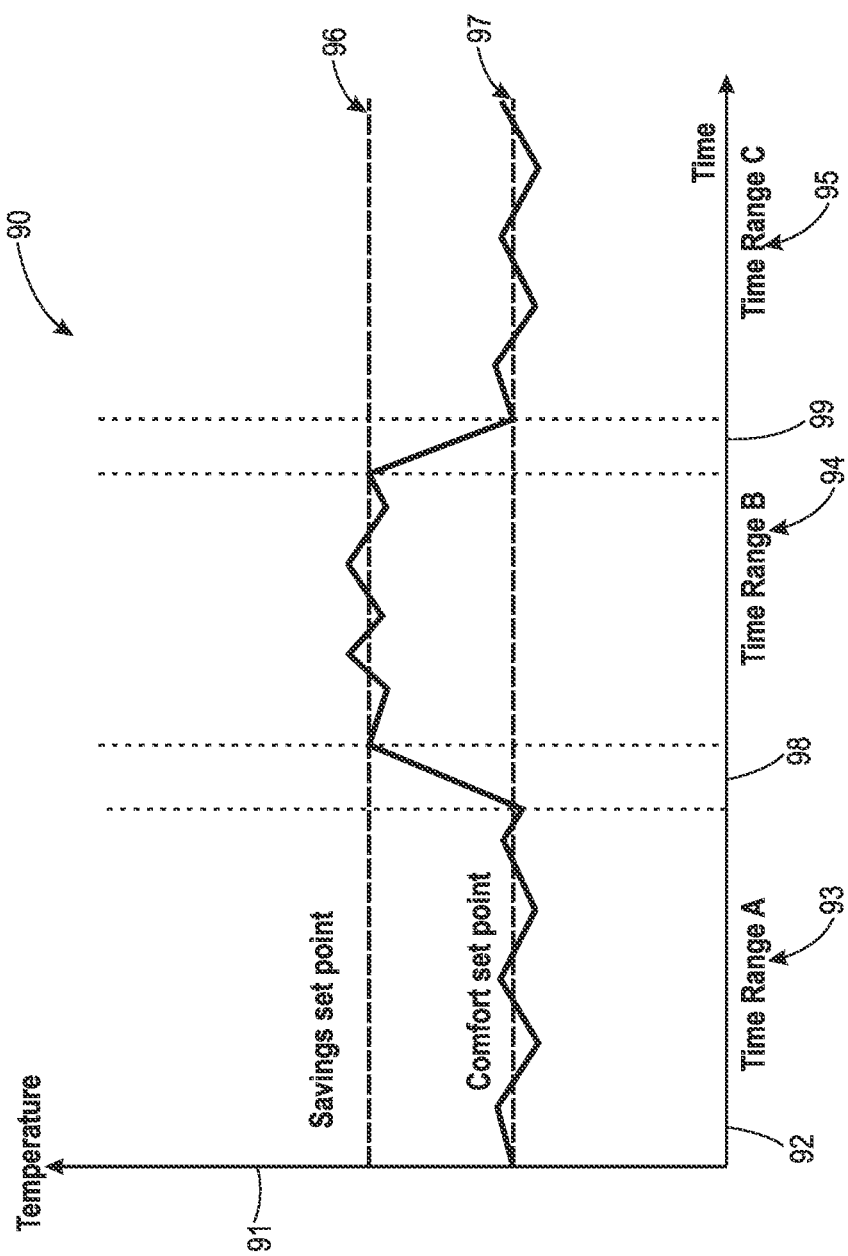
FIG. 8 is a block diagram showing, by way of example, a graph of cooling results using modified set point temperatures.

A similar approach can be used in the summer. If there are enough fans so that all occupants are comfortable if the building rises 2° C. above the traditional setting, the temperature can be allowed to rise that far, which reduces the energy consumed by the central air conditioning system. Later in the day, as the exterior temperature falls, the interior temperature may fall back down to the traditional setting on its own. FIG. 8 is a line graph showing, by way of example, a graph 90 of cooling results using modified or recommended set point temperatures. An x-axis 92 of the graph represents time, while a y-axis 91 represents temperature. During time ranges A 93 and C 95, the temperatures are near the traditional comfort set point 97, while in time range B 94, the temperature reaches the savings set point 96. The lower temperatures in time ranges A and C can be due to lower exterior temperatures early in the morning or at night. The temperature is allowed to increase between time ranges A and B during a transition phase 98, while, the temperature can decrease near the end of the work day during a second transition phase 99 between time ranges B and C. While the invention has been particularly shown and described as referenced to the embodiments thereof, those skilled in the art will understand that the foregoing and other changes in form and detail may be made therein without departing from the spirit and scope of the invention.

What is claimed is:

1. A method for determining HVAC set points, comprising:
   identifying a present season;
   identifying rooms in a space;
   determining an allowable temperature comfort range for each occupant in each of the rooms via a computer processor;
   selecting one of a plurality of processes for calculation of energy saving set point temperatures based on the present season, wherein different seasons are associated with different processes for calculations of the energy saving set point temperatures;
   calculating by the computer processor, the energy saving set point temperatures for the present season using the selected process, wherein each energy saving set point temperature is calculated for one of the rooms based on the allowable temperature comfort range for each occupant in that room;
   selecting one of the energy saving set point temperatures for the one of the rooms as a set point temperature for the space depending on the present season in which the energy saving set point temperature is calculated;
   providing the set point temperature to a thermostat or HVAC system of the space; and
   regulating temperature of the space by the thermostat or HVAC system using the set point temperature.

2. A method according to claim 1, further comprising:
   determining the set point temperature for the space comprising one of:
   computing the maximum over all the allowable temperature comfort ranges for the rooms for heating; and
   computing the minimum over all the allowable temperature comfort ranges for the rooms for cooling.

3. A method according to claim 1, further comprising:
   determining a set point time for initiating the set point temperature for the space.

4. A method according to claim 1, further comprising:
   monitoring a presence or absence of one or more personal comfort devices in each room in the space, wherein the personal comfort devices each comprise one of a portable heating device, portable cooling device, or motorized curtains.

5. A method according to claim 4, further comprising at least one of:
   determining a corrective power of each personal comfort device, wherein the energy saving set point temperature for each of the rooms is calculated based on the allowable temperature comfort range for each occupant in that room and the corrective power of each personal comfort device in that room.

6. A method according to claim 1, wherein the energy saving set point temperatures associated with each room are each calculated based on a lowest temperature of the allowable temperature comfort range for that room, the corrective power of the personal comfort device in the room if present, and an offset value for the room.

7. A method according to claim 1, wherein the energy saving set point temperatures associated with each room are each calculated based on a highest temperature of the allowable temperature comfort range for that room, the corrective power of the personal comfort device in the room if present, and an offset value for the room.

8. A method according to claim 1, further comprising:
   determining a most challenging room comprising the room that requires a highest set point temperature of the space during heating or a lowest set point temperature of the space during cooling to achieve comfort for the occupant in the most challenging room.

9. A method according to claim 8, further comprising:

providing a recommendation to improve the most challenging room comprising at least one of recommending the addition of one or more personal comfort devices, recommending a change of the occupant in the most challenging room, recommending that a motorized vent be opened or closed relative to other vents in the space, and recommending the addition of a dehumidifier to the room.

10. A method according to claim 9, further comprising:
adjusting an airflow to one or more of the rooms by changing at least one of the vents in that room, wherein each vent changed is based on at least one other vent previously changed.

11. A method according to claim 10, wherein the vents are changed manually or automatically by opening the vents.

12. A method according to claim 8, further comprising:
improving the most challenging room.

13. A method according to claim 12, wherein the most challenging room is improved, comprising:
determining whether additional personal comfort devices can be purchased for monetary amount M or less so that the energy saving set point temperature required by the most challenging room becomes lower in winter or higher in summer than a second most challenging room, or becomes equal to the second most challenging room.

14. A method for determining an HVAC set point, comprising:
identify occupants present in a space;
identify rooms in the space in which the occupants are present;
determining a presence or absence of one or more personal comfort devices in each of the rooms with an occupant;
determining a range of comfortable temperatures for each occupant;
determining for each room, an energy saving set point temperature that results in the room being within the range of comfortable temperatures based on the presence or absence of the personal comfort device in that room via a computer processor;
computing via the computer processor over all the energy saving set point temperatures for the rooms, one of the following:
a set point temperature for the space that is the maximum of the energy saving temperatures for the rooms for heating based on values for each of the energy set point temperatures of the rooms; and
a set point temperature for the space that is the minimum of the energy saving temperatures for the rooms for cooling based on values for each of the energy set point temperatures of the rooms;
transmitting the set point temperature from the computer processor to a thermostat or HVAC system; and
regulating temperature of the space by the thermostat or HVAC system using the set point temperature.

15. A method according to claim 14, further comprising:
determining a set point time for initiating the set point temperature for the space.

16. A method according to claim 15, wherein the set point time is determined based on one or more of a current temperature of the space, a likely amount of time needed to heat or cool the space to the set point temperature, arrival or departure times of the occupants, and a highest priority goal of the set point temperature comprising one of energy savings, comfort, or reduced consumption.

17. A method according to claim 14, further comprising at least one of:
determining a corrective power of each personal comfort device; and
determining an offset value for each room comprising a temperature value that represents a difference between a temperature in the room and a previous set point temperature of the space.

18. A method according to claim 14, further comprising:
determining a most challenging room comprising the room that requires a highest set point temperature of the space during heating or a lowest set point temperature of the space during cooling to achieve comfort for the occupant in the most challenging room.

19. A method according to claim 18, further comprising:
providing a recommendation to improve the most challenging room comprising at least one of recommending the addition of one or more personal comfort devices, recommending a change of the occupant in the most challenging room, recommending that a motorized vent be opened or closed relative to other vents in the space, and recommending the addition of a dehumidifier to the room.

20. A system for determining HVAC set points, comprising:
a thermostat or HVAC system; and
a server comprising memory, a central processing unit, an input port to receive data relating to the thermostat or the HVAC system, and an output port, wherein the central processing unit is configured to:
identify a present season;
identify rooms within a space;
determine an allowable temperature comfort range for each occupant in each of the rooms;
select one of a plurality of processes for calculation of energy saving set point temperatures based on the present season, wherein different seasons are associated with different processes for calculations of the energy saving set point temperatures;
calculate the energy saving set point temperatures for the present season using the selected process, wherein each energy saving set point temperature is calculated for one of the rooms based on the allowable temperature comfort range for each occupant of that room;
select one of the energy saving set point temperatures for the one of the rooms as a set point temperature for the space depending on the present season in which the energy saving set point temperature is calculated; and
provide the set point temperature to the thermostat or the HVAC 22 system of the space; and
regulate temperature of the space by the thermostat or HVAC system using the set point temperature.

* * * * *